(12) United States Patent
Lee et al.

(10) Patent No.: US 8,255,414 B2
(45) Date of Patent: Aug. 28, 2012

(54) SEARCH ASSIST POWERED BY SESSION ANALYSIS

(75) Inventors: Chi-Hoon Lee, Los Altos, CA (US);
Eric Crestan, Union City, CA (US);
Jiefeng Shen, Sammamish, WA (US);
Richard Allan Kasperski, Creston (CA); Su-Lin Wu, San Carlos, CA (US);
Omer Emre Velipasaoglu, San Francisco, CA (US); Benoit Dumoulin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 218 days.

(21) Appl. No.: 12/882,974

(22) Filed: Sep. 15, 2010

(65) Prior Publication Data

US 2012/0066195 A1    Mar. 15, 2012

(51) Int. Cl.
*G06F 17/30* (2006.01)

(52) U.S. Cl. ........................................................ 707/767
(58) Field of Classification Search .................. 707/767
See application file for complete search history.

(56) References Cited

U.S. PATENT DOCUMENTS

| | | | |
|---|---|---|---|
| 2007/0050339 A1* | 3/2007 | Kasperski et al. | 707/3 |
| 2008/0071740 A1* | 3/2008 | Jhala et al. | 707/3 |
| 2008/0114721 A1* | 5/2008 | Jones et al. | 707/2 |
| 2009/0187515 A1* | 7/2009 | Andrew et al. | 706/12 |

OTHER PUBLICATIONS

Baeza-Yates, R. et al., "Query recommendation using query logs in search engines," *Current Trends in Database Technology-EDBT 2004 Workshops*, 2004.
Cao, Huanhuan et al., "Context-aware query suggestion by mining click-through and session data," *KDD '08: Proceeding of the 14th ACM SIGKDD international conference on Knowledge discovery and data mining*, 2008.
Manning, Christopher et al., "Foundations of statistical natural language processing", 1999.
Moore, Robert, "On log-likelihood-ratios and the significance of rare events," *Proceedings of EMNLP 2004*.

* cited by examiner

*Primary Examiner* — Thu-Nguyet Le
(74) *Attorney, Agent, or Firm* — SNR Denton US LLP

(57) ABSTRACT

One embodiment selects from a set of query-suggestion pairs a first query and a subset of query-suggestion pairs that each has the first query as its query; computes a Log Likelihood Ratio (LLR) value for each query-suggestion pair from the subset of query-suggestion pairs; ranks the subset of query-suggestion pairs according to their respective LLR values; removes from the subset of query-suggestion pairs all query-suggestion pairs whose LLR values are below a predetermined LLR threshold; computes a Pointwise Mutual Information (PMI) value for each remaining query suggestion pair from the subset of query-suggestion pairs; removes from the subset of query-suggestion pairs all query-suggestion pairs whose PMI values are below a predetermine PMI threshold; and constructs a ranked set of suggestions for the first query, wherein the ranked set of suggestions comprises one or more suggestions of the remaining query-suggestion pairs from the subset of query-suggestion pairs.

24 Claims, 3 Drawing Sheets

SEARCH ASSIST POWERED BY SESSION ANALYSIS

TECHNICAL FIELD

The present disclosure generally relates to search engines and more specifically relates to determining suggestions for search queries.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources or contents. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www.google.com). To search for information relating to a specific subject matter or topic on the Internet, a network user typically provides a short phrase or a few keywords describing the subject matter, often referred to as a "search query" or simply "query", to a search engine. The search engine conducts a search based on the search query using various search algorithms and generates a search result that identifies network resources or contents that are most likely to be related to the search query. The network resources or contents are presented to the network user, often in the form of a list of links, each link being associated with a different network document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, speed, and user friendliness are but a few of the performance aspects of the search engines for improvement.

SUMMARY

The present disclosure generally relates to search engines and more specifically relates to determining suggestions for search queries.

Particular embodiments select from a set of query-suggestion pairs a first query, wherein: each query-suggestion pair from the set of query-suggestion pairs comprises a query and a suggestion; and the first query is the query of at least one query-suggestion pair from the set of query-suggestion pairs. Particular embodiments select from the set of query-suggestion pairs a subset of query-suggestion pairs, wherein: the subset of query-suggestion pairs comprises one or more distinct query-suggestion pairs from the set of query-suggestion pairs; and the first query is the query of each query-suggestion pair from the subset of query-suggestion pairs. Particular embodiments compute a Log Likelihood Ratio (LLR) value for each query-suggestion pair from the subset of query-suggestion pairs; rank the subset of query-suggestion pairs according to their respective LLR values; remove from the subset of query-suggestion pairs all query-suggestion pairs whose LLR values are below a predetermined LLR threshold; compute a Pointwise Mutual Information (PMI) value for each remaining query suggestion pair from the subset of query-suggestion pairs; remove from the subset of query-suggestion pairs all query-suggestion pairs whose PMI values are below a predetermine PMI threshold; and construct a ranked set of suggestions for the first query, wherein the ranked set of suggestions comprises one or more suggestions of the remaining query-suggestion pairs from the subset of query-suggestion pairs.

These and other features, aspects, and advantages of the disclosure are described in more detail below in the detailed description and in conjunction with the following figures.

DESCRIPTION OF EXAMPLE EMBODIMENTS

Figure 1:
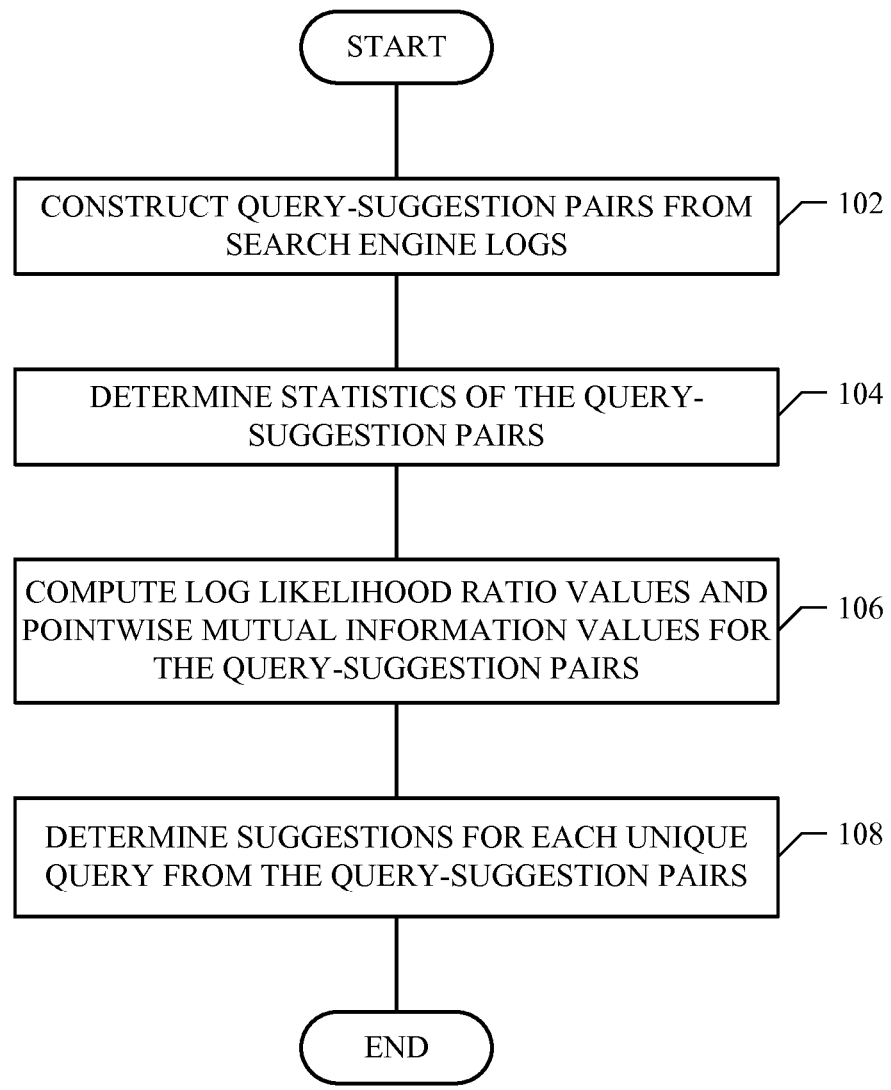
FIG. 1 illustrates an example method for determining suggestions for search queries.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more words that describe a subject matter of interest. In response, the search engine may identify one or more network resources that are likely to be related to the search query, which may collectively be referred to as a "search result" identified for the search query. The network resources are usually ranked and presented to the network user according to their relative degrees of relevance to the search query.

To help their users locate the relevant information quickly and easily, sophisticated search engines often support functionalities in addition to merely identifying the network resources for the individual search queries. In particular embodiments, a search engine may provide, to a network user, suggestions for a search query issued by the network user to the search query. In particular embodiments, the search engine may provide any number of suggestions for a single search query (e.g., five suggestions for a search query). In particular embodiments, each suggestion may be a short phrase or one or more words determined based on the search query, which may be considered related or relevant to the search query. If the network user selects a suggestion, the suggestion is issued to the search engine as another search query. In this sense, a suggestion for a search query may itself become a search query.

For example, suppose a network user issues a search query "bike rack" to a search engine. In response, the search engine may provide the following suggestions: "bike stand", "thule", "yakima", "bike accessories", and "sports authority". In particular embodiments, these suggestions may be included in a web page that contains the search result identified for the search query "bike rack", each suggestion as a clickable link. If the user clicks on any one of the suggestions (e.g., "thule"), then the suggestion is automatically issued to the search engine as a new search query. The search engine may identify a second search result for the suggestion and present the second search result to the network user in a similar manner as with any search query issued to the search engine.

Particular embodiments may determine suggestions for search queries by extracting query-suggestion pairs from query logs and selecting suggestions for individual queries based on statistical information determined for the query-suggestion pairs. FIG. 1 illustrates an example method for determining suggestions for search queries.

In particular embodiments, a search engine may maintain logs of user activities performed in connection with the search engine. For example, the search engine may maintain records of each search query issued to the search engine, the time at which the search query is received, the user session during which the search query is issued, the browser cookie of the browser through which a network user accesses the search engine and issues the search query, the network resources identified for the search query, the links clicked by the network user after issuing the search query (e.g., the links that are contained in the web page used to present the search result for the search query), and so on.

Particular embodiments may parse the logs maintained by a search engine to extract the individual search queries received at the search engine and use these search queries to construct one or more query-suggestion pairs. Each query-suggestion pair includes a query and a suggestion for the query. Particular embodiments may select two queries from the logs to form a query-suggestion pair, where one of the two queries is considered the query of the query-suggestion pair and the other one of the two queries is considered the suggestion for the query of the query-suggestion pair. For example, a sequence of queries, denoted as $q_1, q_2, q_3, q_4, q_5, q_6, \ldots$, where each $q_i$ represents a search query received at the search engine, may be extracted from the search engine logs such that the queries are ordered according to the time they have been received at the search engine. Thus, $q_1$ is received at the search engine before $q_2$, which in turn is received at the search engine before $q_3$, and so on. In particular embodiments, each $q_i$ may be a search query manually issued to the search engine by a network user, resulting, for example, from the network user entering the search query into a text input field through a web browser, or a search query automatically issued to the search engine, resulting, for example, from a network user clicking on a query suggestion contained in a web page. Particular embodiments may select two queries from the query sequence to form a query-suggestion pair, with the preceding query as the query of the query-suggestion pair and the succeeding query as the suggestion for the query of the query-suggestion pair.

Particular embodiments may construct a set of query-suggestion pairs from query sequences extracted from logs maintained by a search engine, as illustrated in step 102. To obtain a sufficient number of query-suggestion pairs, particular embodiments may extract information from logs obtained over a period of time (e.g., one year or more).

Let (q,s) denote a query-suggestion pair, where q represents a query and s represents a suggestion for the query q. To construct one query-suggestion pair, particular embodiments may take two search queries from a query sequence and consider the first search query (i.e., the preceding query in the query sequence) as the query, q, of the query-suggestion pair and the second search query (i.e., succeeding query in the query sequence) as the suggestion, s, of the query-suggestion pair. Since a suggestion may itself be a search query, one search query may be used as a suggestion for another search query. For example, in the above query sequence, $q_1$ and $q_2$ are two queries with $q_2$ following $q_1$. Thus, $q_1$ and $q_2$ may form a query-suggestion pair, $(q_1, q_2)$, where $q_1$ (i.e., the preceding query in the sequence) is the query and $q_2$ (i.e., the succeeding query in the sequence) is the suggestion for $q_1$. Similarly, $q_2$ and $q_3$ are two queries from the above query sequence with $q_3$ following $q_2$. Thus, $q_2$ and $q_3$ may form a query-suggestion pair, $(q_2, q_3)$ where $q_2$ is the query and $q_3$ is the suggestion for $q_2$. In particular embodiments, the two search queries from a query sequence that are used to construct a query-suggestion pair are two consecutive queries, with no other query in between them in the query sequence. Alternatively, in particular embodiments, the two search queries from a query sequence that are used to construct a query-suggestion pair do not need to be two consecutive queries, although they can be two consecutive queries. Instead, any two queries that have been received during the same user session may be used to construct a query-suggestion pair. For example, $q_1$ and $q_4$ are two queries from the above query sequence with $q_4$ following $q_1$, but they are not two consecutive queries in the sequence because $q_2$ and $q_3$ are between them. And yet, in particular embodiments, they may form a query-suggestion pair, $(q_1, q_4)$, where $q_1$ is the query and $q_4$ is the suggestion for $q_1$. Similarly, $q_1$ and $q_5$ may form a query-suggestion pair, $(q_1, q_5)$, as they are from the same user session. As these examples illustrate, in particular embodiments, given any search query, $q_i$, from a query sequence, it may be the query of one query-suggestion pair and the suggestion of another query-suggestion pair. That is, a search query from a query sequence may appear in any number of query-suggestion pairs, either as the query or as the suggestion of a particular query-suggestion pair.

Sometimes, not all search queries extracted from search engine logs are good candidates for constructing query-suggestions pairs. To improve the quality of the query-suggestion pairs constructed from the query sequences, particular embodiments may apply any number of filters.

Sometimes, when a network user enters a search query in his web browser, he may misspell a word (e.g., misspelling "french restaurant" as "frnech retaurant". The search engine, upon receiving the misspelled search query, may present the network user with a web page that includes the correct spelling of the query words (e.g., "french restaurant". The network user may realize his mistake and click on the correctly spelled query, which causes the correctly spelled query to be issued to the search engine as well. In this case, both the misspelled search query and the correctly spelled search query are logged by the search engine, and yet, the misspelled query may not be a good candidate for constructing query-suggestion pairs. Therefore, when extracting search queries from search engine logs for the purpose of constructing query-suggestion pairs, particular embodiments may apply a filter to discard any search query that contains misspelled words.

Sometimes, a network user may desire to search for some information and yet may be uncertain of what search query to use. The network user may issue one search query and receive a search result in response. After examining the search result, the network user may determine that none of the network resources included in the search result is relevant to what he is searching for. Thus, the network user may issue another search query or click on a suggestion provided by the search engine, and receive a second search result in response. In this case, the first search query used by the user does not really represent or characterize the information the network user is searching for as it has not led to any network resources that the user considers relevant, and thus may not be a good candidate for constructing query-suggestion pairs. Therefore, when selecting two queries from a query sequence to construct a query-suggestion pair, particular embodiments may apply a filter to ignore any search query that does not have at least one click immediately following it.

In this case, instead of only extract queries from the search engine logs, particular embodiments may parse the logs maintained by a search engine to extract the individual search queries received at the search engine and the link clicks made by the network users, forming query-click sequences instead of just query sequences. For example, suppose between the queries in the above query sequence, there are clicks made by the network user. Thus, from the search engine logs, the following sequence of queries and clicks may be extracted: . . . , $q_1, c_1, c_2, q_2, c_3, q_3, q_4, c_4, q_5, c_5, c_6, c_7, q_6, \ldots$, where each $q_i$ represents a search query issued to the search engine and each $c_j$ represents a click made by a network user. In particular embodiments, each $q_i$ may be a search query manually issued to the search engine by a network user, resulting, for example, from the network user entering the search query into a text input field through a web browser, or a search query automatically issued to the search engine, resulting, for example, from a network user clicking on a query suggestion contained in a web page.

In the above query-click sequence, search query $q_1$ is followed by two user clicks $c_1$ and $c_2$, indicating that after issuing search query $q_1$ to the search engine, the user clicks on two links contained in the web page used to present the search result for search query $q_1$. Then, a second search query $q_2$ is issued to the search engine, and the user clicks on one link contained in the web page used to present the search result for search query $q_2$. And so on. A user click may be made on any type of clickable links, such as, for example and without limitation, a URL link to a network resource identified for the search query, an advertisement, a suggestion for the search query, a third-party application, etc.

For example, in the above query-click sequence, $q_3$ does not have any click immediately following it, as $q_4$ immediately follows $q_3$. Thus, $q_3$ may be discarded (e.g., removed from the query-click sequence) and not used to construct any query-suggestion pairs. Instead, $q_2$ and $q_4$ may form a query-suggestion pair, $(q_2,q_4)$, with $q_4$ being the suggestion for $q_2$ and skipping $q_3$.

Given any query-click sequence, each query in the sequence may have any number of clicks immediately following it. For example, in the above query-click sequence, $q_1$ has two clicks immediately following it; $q_2$ has one click immediately following it; $q_3$ has no click immediately following it; and $q_5$ has three clicks immediately following it. The number of clicks made by a network user immediately following a search query may suggest how important that search query is to the network user. Particular embodiments may consider that the more clicks immediately follow a search query, the more important (e.g., the higher priority) that search query is.

A suggestion for a search query is typically related to the search query in some manner. On the other hand, the search queries issued by one network user often have no connection or relationship with the search queries issued by another network user. Similarly, the search queries issued by a network user during one day often have no connection or relationship with the search queries issued by the same network user during another day. Particular embodiments may apply a filter to limit each query or query-click sequence extracted from the search engine logs to only include search queries and clicks made during a single user session within a single day. For example, the queries and clicks in the above query-click sequence may all be from the same user session. In particular embodiments, when constructing the query-suggestion pairs, each query is only paired with another query immediately following the first query in the same query or query-click sequence and thus from the same user session. Suppose, in the above query sequence, $q_6$ is the very last query logged during the user session. In this case, $q_5$ and $q_6$ may form a query-suggestion pair with $q_5$ being the query and $q_6$ being the suggestion for $q_5$, but because there is no more query that follows $q_6$ in the sequence, $q_6$ itself does not have a suggestion from the same user session and thus no query-suggestion pair is formed with $q_6$ being the query.

Sometimes, even during a single user session, a network user may search for different, unrelated information. For example, during a single user session, the user may first search for information about the local French restaurants, and then search for information about different models of mobile telephones. The search queries used by the user to search for information about the French restaurants probably have no relationship with the search queries used by the user to search for information about the mobile telephones. Consequently, a search query relating to the mobile telephones is not a good candidate as a suggestion for a search query relating to the French restaurants, and vice versa. To better incorporate user intent when constructing the query-suggestion pairs, particular embodiments may apply a filter to further limit the two queries used to construct a query-suggestion pair to be received at the search engine within a predetermined time period (e.g., within a ten-minute window).

In particular embodiments, given any particular query $q_i$ found in a query or query-click sequence, suppose the query $q_i$ is paired with one or more queries $q_j$ following the query $q_i$ in the sequence to form one or more query-suggestion pairs $(q_i, q_j)$ respectively, where the query $q_i$ is the query in each query-suggestion pair and each query $q_j$ is the suggestion for $q_i$ in each query-suggestion pair. In particular embodiments, all the queries $q_j$ have been received within a certain time period (e.g., ten minutes) from the time the query $q_i$ is received. In other words, the query $q_i$ and all the queries $q_j$ have all been received within a certain time period starting from the time the query $q_i$ is received. In this case, particular embodiments may assume that within a certain time period, a user's intent may remain the same (e.g., the user is searching for the same type of information within a certain time period).

For example, in the above query-click sequence, suppose that $q_1, c_1, c_2, q_2, c_3, q_3, q_4$ have occurred within a first ten-minute window starting from the time $q_1$ has been received at the search engine. Then, $q_1$ may be paired with $q_2$, $q_3$ (suppose whether any click follows a query is not considered for this example), and $q_4$ to form three query-suggestion pairs: $(q_1,q_2)$, $(q_1,q_3)$, and $(q_1,q_4)$. Suppose that, starting from the time $q_2$ has been received, $q_2, c_3, q_3, q_4, c_4, q_5, c_5, c_6, c_7, q_6$ have occurred within a second ten-minute window. Then $q_2$ may be paired with $q_3, q_4, q_5$, and $q_6$ to form four query-suggestion pairs: $(q_2,q_3)$, $(q_2,q_4)$, $(q_2,q_5)$, and $(q_2,q_6)$. Suppose that during the third ten-minute window starting from the time $q_3$ has been received, $q_3, q_4, c_4, q_5, c_5, c_6, c_7, q_6$. Then $q_3$ may be paired with $q_4, q_5$, and $q_6$ to form three query-suggestion pairs: $(q_3,q_4)$, $(q_3,q_5)$, and $(q_3,q_6)$. And so on, with the time window move down the query-click sequence one query at a time.

Sometimes, a network user may issue the same search query to a search engine multiple times during a single day. To avoid potential bias that may be induced by habitual search patterns produced by a specific network user, particular embodiments may apply a filter to limit that if the same user issues the same search query to the search engine multiple times during the same day, then that search query is only included once in a query or query-click sequence extracted from the search engine logs for that day. Of course, if the user issues the same search query again in another day, that search query may be included again in another query or query-click sequence. This may prevent too many query-suggestion pairs being constructed that all include this particular search query, either as a query or as a suggestion, for a particular day. Alternatively, if the same search query is issued to the search engine multiple times by the same user during the same day, particular embodiments may examine the specific time when each instance of the search query is received at the search engine. If the user issues the search query multiple times within a relatively short time period (e.g., within half an hour), the search query is included only once in a query or query-click sequence. On the other hand, if the user issues the search query multiple times during the same day but the instances are relatively far apart (e.g., the second instance is six hours later than the first instance), then both the first and the second instances may be included in the same or two different query or query-click sequences.

Sometimes, an entity (e.g., a software program) may simulate the activities of a network user and automatically issue search queries to a search engine for some purpose, causing these search queries to be logged by the search engine. Whether the purpose is benign or malicious, such search queries, if used to construct query-suggestion pairs, may not result in desirable query-suggestion pairs because the search queries may not be related to each other due to a lack of user intent from a human user. To avoid potential bias that may be caused by such search queries, particular embodiments may apply a filter to limit that if an entity has issued a large number of search queries (e.g., more than 250 search queries) to the search engine during a single day, then all search queries issued by this entity may be discarded and not used to construct query-suggestion pairs, as it is very likely that such an entity is not a human user. Similarly, if there are a large number of search queries (e.g., more than 250 search queries) issued during a single session, this may be the result of spamming. Particular embodiments may apply a filter to limit that if a single session contains more than a certain number of search queries, all queries from this session are ignored when constructing query-suggestion pairs. The number of search queries limited for an entity per day or for a session may be determined based on empirical data or experiments.

Sometimes, a search query may either be very short or very long in terms of, for example, the number of characters in the query. For example, the query "restaurant" has a length of 10 as it has 10 letters in the word, and the query "hello" has a length of 5. A very short query may be too general and thus has insufficient information. On the other hand, a very long query may be too specific or may be the result of spamming. Neither case may be a good candidate for determining query-suggestion pairs. Particular embodiments may apply a filter to ignore any query whose length is less than a predetermined lower threshold (e.g., 3) and greater than a predetermined upper threshold (e.g., 127) so that such queries in the query or query-click sequences are not selected for the purpose of constructing query-suggestion pairs. The lower and upper length thresholds may be determined based on empirical data or experiments.

In particular embodiments, when constructing query-suggestion pairs, the queries from user sessions where the users are connected at a social-networking system may be considered. For example, if two users, user 1 and user 2, both are members of a social networking website (e.g., Facebook) and are connected (e.g., friends with each other) at the social networking website, the queries from their user sessions may be paired up to construct query-suggestion pairs. A query from user 2 may be considered as a suggestion for a query from user 1, or vice versa. If the two users share common interests, they may issue queries that relate to similar subject matters. For example, if both user 1 and user 2 are interested in sports, they may both issue sport-related queries to a search engine at different times. In this case, since the queries from the two users may relate to the same or similar subject matters, a query from one user may be considered as a suggestion for a query from the other user.

Particular embodiments may apply additional filters when constructing the set of query-suggestion pairs, the present disclosure contemplates any suitable filter. For example, particular embodiments may construct a function to select the search queries from search engine logs for each user or for each category of users. Particular embodiments may aggregation information extracted from the search engine logs.

Particular embodiments may construct a set of query-suggestion pairs from the logs maintained by a search engine and optionally apply a number of filters to improve the quality of the constructed query-suggestion pairs, as described above. Let QS denote the set of query-suggestion pairs, and N denote the total number of query-suggestion pairs in the set QS, where $N \geq 1$. In particular embodiments, for any given query-suggestion pair, $(q,s)$, it may appear any number of times in the set of query-suggestion pairs QS. In other words, the N query-suggestion pairs in the set QS are not necessarily distinct and in fact, are probably not distinct query-suggestion pairs. For any given query, q, it may appear in any number of query-suggestion pairs in the set QS, possibly being paired with different suggestions. For any given suggestion, s, it may appear in any number of query-suggestion pairs in the set QS, possibly being paired with different queries. Furthermore, the same set of words may be a query in one query-suggestion pair and a suggestion in another query-suggestion pair in the set QS.

For each distinct query that may be found in the set of query-suggestion pairs, particular embodiments may determine a set of suggestions for that specific query using statistical information derived from the set of query-suggestion pairs QS. Using one specific query, $q_i$, as an example, in the set of query-suggestion pairs QS, the query $q_i$ may appear in any number of query-suggestion pairs, possibly being paired with different suggestions. Suppose in the set of query-suggestion pairs, the query $q_i$ are paired with J distinct suggestions, denoted as $S_1 \ldots S_J$, where $J \geq 1$. Then in the set of query-suggestion pairs, there are J distinct query-suggestion pairs with $q_i$ as the query for each pair: $(q_i,s_1), (q_i,s_2), \ldots, (q_i,s_J)$. Note that each distinct query-suggestion pair $(q_i,s_j)$, where $1 \leq j \leq J$, may appear any number of times in the set of query-suggestion pairs QS.

Given any query-suggestion pair, (q,s), from the set of query-suggestion pairs QS, particular embodiments may determine a number of statistical features for the query-suggestion pair (q,s) using the set of query-suggestion pairs, as illustrated in step 104.

Given a distinct query-suggestion pair, (q,s), from the set QS, particular embodiments may determine the number of co-occurrence of q and s, denoted as $N_{q,s}$, in the set QS. In particular embodiments, $N_{q,s}$ may be determined as the total number of times the query-suggestion pair (q,s) appears in the set of query-suggestion pairs QS. As described above, a particular query-suggestion pair may appear any number of (i.e., one or more) times in the set of query-suggestion pairs QS. Accordingly, $N_{q,s}$ indicates the number of co-occurrences of q and s (i.e., q and s appear in the same query-suggestion pair) in the set of query-suggestion pairs QS. In particular embodiments, the probability of the co-occurrence of q and s, denoted as p(q,s), may be computed as $$p(q, s) = \frac{N_{q,s}}{N}.$$

Given a distinct query, q, from any query-suggestion pair in the set QS, particular embodiments may determine the number of occurrence of q, denoted as $N_q$, in the set QS, regardless of with which suggestion q is paired. In particular embodiments, $N_q$ may be determined as the total number of query-suggestion pairs, in the set QS, in which q appears as the query, regardless of with which suggestion the query q is paired in each query-suggestion pair (i.e., the total number of query-suggestion pairs (q,*) appear in the set QS, where "*" may be any suggestion). As described above, a particular query may appear in any number of (i.e., one or more) query-suggestion pairs in the set of query-suggestion pairs, where the query may be paired with different suggestions. Accordingly, $N_q$ indicates the total number of query-suggestion pairs having q paired with any suggestions in the set QS. In particular embodiments, the probability of the occurrence of q, denoted as p(q), may be computed as $$p(q) = \frac{N_q}{N}.$$

Given a distinct suggestion, s, from any query-suggestion pair in the set QS, particular embodiments may determine the number of occurrence of s, denoted as $N_s$, in the set QS, regardless of with which query s is paired. In particular embodiments, $N_s$ may be determined as the total number of query-suggestion pairs, in the set QS, in which s appears as the suggestion, regardless of with which query the suggestion s is paired in each query-suggestion pair (i.e., the total number of query-suggestion pairs (*,s) appear in the set QS, where "*" may be any query). As described above, a particular suggestion may appear in any number of (i.e., one or more) query-suggestion pairs in the set of query-suggestion pairs, where the suggestion may be paired with different queries. Accordingly, $N_s$ indicates the total number of query-suggestion pairs having s paired with any queries in the set QS. In particular embodiments, the probability of the occurrence of s, denoted as p(s), may be computed as $$p(s) = \frac{N_s}{N}.$$

Particular embodiments may derive additional statistical information from the above information with respect to a set of query-suggestions, distinct query-suggestion pairs in the set, distinct queries in the set, and distinct suggestions in the set, including N, $N_{q,s}$, $N_q$, and $N_s$.

Given a distinct query-suggestion pair, (q,s), from the set QS, particular embodiments may determine the total number of query-suggestion pairs in the set QS that do not have q as their query and s as their suggestion (i.e., having NOT q and NOT s), which may be denoted as $N_{\bar{q},\bar{s}}$. Particular embodiments may compute $N_{\bar{q},\bar{s}}$ as $N_{\bar{q},\bar{s}} = N - (N_q + N_s - N_{q,s})$. In particular embodiments, the probability of q and s not in a query-suggestion pair in the set QS, denoted as $p(\bar{q},\bar{s})$, may be computed as $$p(\bar{q}, \bar{s}) = \frac{N_{\bar{q},\bar{s}}}{N}.$$

Given a distinct query, q, from any query-suggestion pair in the set QS, particular embodiments may determine the total number of query-suggestion pairs in the set QS that do not have q as their query (i.e., having NOT q). Particular embodiments may compute $N_{\bar{q}}$ as $N_{\bar{q}} = N - N_q$. In particular embodiments, the probability of q not in a query-suggestion pair in the set QS, denoted as $p(\bar{q})$, may be computed as $$p(\bar{q}) = \frac{N_{\bar{q}}}{N} = \frac{N - N_q}{N}.$$

Given a distinct suggestion, s, from any query-suggestion pair in the set QS, particular embodiments may determine the total number of query-suggestion pairs in the set QS that do not have s as their suggestion (i.e., having NOT s), which may be denoted as $N_{\bar{s}}$. Particular embodiments may compute $N_{\bar{s}}$ as $N_{\bar{s}} = N - N_s$. In particular embodiments, the probability of s not in a query-suggestion pair in the set QS, denoted as $p(\bar{s})$, may be computed as $$p(\bar{s}) = \frac{N_{\bar{s}}}{N} = \frac{N - N_s}{N}.$$

Given a distinct query-suggestion pair, (q,s), from the set QS, particular embodiments may determine the total number of query-suggestion pairs in the set QS that q appears as the query but is paired with any suggestion other than s. This number may be denoted as $N_{q,\bar{s}}$, which may be computed as $N_{q,\bar{s}} = N_q - N_{q,s}$. In particular embodiments, the probability of q in a query-suggestion pair but is paired with any suggestion other than s in the set QS, denoted as $p(q,\bar{s})$, may be computed as $$p(q, \bar{s}) = \frac{N_{q,\bar{s}}}{N} = \frac{N_q - N_{q,s}}{N}.$$

Given a distinct query-suggestion pair, (q,s), from the set QS, particular embodiments may determine the total number of query-suggestion pairs in the set QS that s appears as the suggestion but is paired with any query other than q. This number may be denoted as $N_{\bar{q},s}$, which may be computed as $N_{\bar{q},s} = N_s - N_{q,s}$. In particular embodiments, the probability of s in a query-suggestion pair but is paired with any query other than q in the set QS, denoted as $p(\bar{q},s)$, may be computed as $$p(\bar{q}, s) = \frac{N_{\bar{q},s}}{N} = \frac{N_s - N_{q,s}}{N}.$$

In particular embodiments, for the query $q_i$ that are paired with J distinct suggestions, forming J distinct query-suggestion pairs $(q_i, s_1), \ldots, (q_i, s_J)$, the above statistical features are determined for each of the J distinct query-suggestion pairs.

Particular embodiments may apply a filter based on the co-occurrence of $q_i$ and $s_j$ from each distinct query-suggestion pair $(q_i, s_j)$. If a specific query-suggestion pair has a relatively low co-occurrence number, then particular embodiments may consider that there is insignificant association between the query and suggestion in this pair. Particular embodiments may remove this specific query-suggestion pair from consideration when determining the suggestions for the query $q_i$. For example, suppose there is a query-suggestion pair $(q_i, s_6)$ for the query $q_i$, and the co-occurrence number $N_{q_i, s_6}$ for $(q_i, s_6)$ is less than 30 over a two-year period. Then, the pair $(q_i, s_6)$ may be removed from consideration when determining suggestions for query $q_i$ so that $s_6$ does not become a suggestion for the query $q_i$.

Particular embodiments may then compute a Log Likelihood Ratio (LLR) value and a Pointwise Mutual Information (PMI) value for each of the J (less than J if some query-suggestion pairs have been removed and ignored due to low co-occurrence, as described above) distinct query-suggestion pairs using the statistical features determined for each query-suggestion pair, as illustrated in step 106.

The LLR value of a query-suggestion pair (q,s) indicates the strength of association between q and s. In particular embodiments, given a query-suggestion pair, (q,s), its LLR value may be computed using the following equations:

$$LLR(q,s) = N \times (p_1 + p_2 + p_3 + p_4); \quad (1a)$$

where:

$$p_1 = p(q, s) \times \log\left(\frac{p(q, s)}{p(q) \times p(s)}\right), \quad (1b)$$

$$p_2 = p(\bar{q}, s) \times \log\left(\frac{p(\bar{q}, s)}{p(\bar{q}) \times p(s)}\right), \quad (1c)$$

$$p_3 = p(q, \bar{s}) \times \log\left(\frac{p(q, \bar{s})}{p(q) \times p(\bar{s})}\right), \text{ and} \quad (1d)$$

$$p_4 = p(\bar{q}, \bar{s}) \times \log\left(\frac{p(\bar{q}, \bar{s})}{p(\bar{q}) \times p(\bar{s})}\right). \quad (1e)$$

The individual terms have been defined above.

The PMI value of a query-suggestion pair (q,s) indicates the actual probability of the joint occurrence of q and s by penalizing the independence assumption between q and s, which is represented as $p(q) \times p(s)$ in EQUATION (2) below. In particular embodiments, given a query-suggestion pair, (q,s), its PMI value may be computed using the following equation:

$$PMI(q, s) = \log\frac{p(q, s)}{p(q) \times p(s)} = \log\frac{\frac{N_{q,s}}{N}}{\frac{N_q}{N}\frac{N_s}{N}} = \log\left(N\frac{N_{q,s}}{N_q \times N_s}\right). \quad (2)$$

In particular embodiments, for the query $q_i$ that are paired with J distinct suggestions, forming J distinct query-suggestion pairs $(q_i, s_1), \ldots, (q_i, s_J)$, the LLR and PMI values may be computed for each of the J distinct query-suggestion pairs. Particular embodiments may then determine a set of suggestions for the query $q_i$ based on the LLR and PMI values computed for the J distinct query-suggestion pairs, as illustrated in step 108. In general, a LLR value may range from 0 to positive infinite and a PMI value may range from negative infinite to positive infinite.

Particular embodiments may compute the LLR value for each of the J distinct query-suggestion pairs, and then order the J distinct query-suggestion pairs according to their respective LLR values. That is, particular embodiments may order the query-suggestion pairs $(q_i, s_1), \ldots, (q_i, s_J)$ according to their respective LLR values, where the query-suggestion pairs having relatively higher LLR values are ranked higher. In particular embodiments, any query-suggestion pair with a LLR value below a predetermined threshold may be discarded. The LLR threshold may be determined based on experiments or empirical data. For example, the LLR threshold may be 40, and any query-suggestion pair with a LLR value below 40 may be discarded. Then, particular embodiments may compute the PMI value for each of the remaining query-suggestion pairs. In particular embodiments, any query-suggestion pair with a PMI value below a predetermined threshold may also be discarded. The PMI threshold may be determined based on experiments or empirical data. For example, the PMI threshold may be 2, and any query-suggestion pair with a PMI value below 2 may be discarded.

In particular embodiments, very few of empirical data (e.g., 4000 pairs of (q,s)) are used to determine the thresholds of LLR and PMI, which is significantly efficient in minimizing costs that involves in human experts' interventions. Considering the fact that typically, the final database contains more than 20 million (q,s) pairs, determining the stats of LLR and PMI using only 4000 pairs samples is significantly effective and efficient approach.

In particular embodiments, the final remaining query-suggestion pairs may provide a ranked set of suggestions for the query $q_i$. For example, suppose the remaining query-suggestion pairs, ranked according to their respective LLR values, for the query $q_i$ are: $(q_i,s_{12})$, $(q_i,s_4)$, $(q_i,s_8)$, $(q_i,s_{23})$, $(q_i,s_9)$, $(q_i,s_{47})$, $(q_i,s_{35})$, $(q_i,s_{18})$, and $(q_i,s_{26})$. Then the ranked set of suggestions for the query $q_i$ is $\{s_{12}, s_4, s_8, s_{23}, s_9, s_{47}, s_{35}, s_{18}, s_{26},\}$. Subsequently, when any network user issues the search query $q_i$ to the search engine, particular embodiments may select a number of top-ranked suggestions (e.g., the five top-ranked suggestions) for the search query $q_i$ to be presented to the network user as suggestions for the search query $q_i$.

Experiments suggest that both LLR and PMI individually have their own disadvantages. There is data sparseness issue with LLR and sensitivity in low frequency co-occurrence of query-suggestion pairs with PMI. For a given query-suggestion pair (q,s), the LLR value computed for the pair is the expectation of a value of a random variable instead of the expectation of a random variable, which suffers from data sparseness. The PMI value explicitly quantifies the amount of information available about a co-occurrence between q and s. By combining both LLR and PMI values, particular embodiments quantify the strength of association between a search query q and a suggestion s by considering a possibility that the co-occurrence of q and s is observed by chance. The suggestions thus determined for a search query are both relevant and diversified.

In particular embodiments, a query includes one or more words, where each word may be a combination of letters, digits, or symbols. Similarly, a suggestion includes one or more words, where each word may be a combination of letters, digits, or symbols. In particular embodiments, a suggestion is a search query extracted from logs maintained by a search engine, where the logs record search queries issued to the search engine by network users. That is, a suggestion may be any one of the search queries issued to a search engine by the network users. Thus, particular embodiments may consider a query and a suggestion each as a set of words. Let $W_q$ denote the set of words that forms a query, and $W_s$ denote the set of words that forms a suggestion. Given a query q and its suggestion s, particular embodiments may consider that the query q and the suggestion s may have three types of relationships based on their respective sets of words. Note that since s is a suggestion for q, s and q typically are not exactly the same (i.e., includes the same set of words).

First, s may contain all the words of q (i.e., $W_q \subset W_s$). Of course, s may also contain one or more words not in q. In this case, particular embodiments may consider that q and s have a "specialization" relationship. Second, q may contain all the words of s (i.e., $W_q \supset W_s$). Again, q may also contain one or more words not in s. In this case, particular embodiments may consider that q and s have a "generalization" relationship. Third, neither does s contain all the words of q nor does q contain all the words of s (i.e., all cases other than the first and the second cases), even though q and s may share one or more common words. In this case, particular embodiments may consider that q and s have a "lateral move" relationship. Note that each suggestion for a search query may have one of the three possible types of relationship with the search query.

Each time when selecting suggestions for a search query, particular embodiments may select only suggestions having the same type of relationship with the search query (e.g., only suggestions having the lateral-move relationship with the search query) or suggestions having a combination of different types of relationship with the search query. When mixing suggestions having different types of relationship with the search query, particular embodiments may choose a function (e.g., a weighted function) to indicate how many suggestions of each type of relationship are selected.

For example, suppose among the nine suggestions determined for the search query $q_i$ above, $s_4$, $s_{23}$, $s_9$, $s_{18}$, and $s_{26}$ are the ones having the lateral-move relationship with $q_i$. Thus, when selecting five suggestions for $q_i$, if only suggestions having the lateral-move relationship with $q_i$ are to be selected, then $s_4$, $s_{23}$, $s_9$, $s_{18}$, $s_{26}$ are selected, even though they are not strictly the top-ranked five suggestions for $q_i$ based on the LLR values. The highest-ranked suggestion for $q_i$, based on the LLR values, is in fact $s_{12}$, but since $s_{12}$ does not have the lateral-move relationship with $q_i$, it is not selected in this case.

Figure 2:
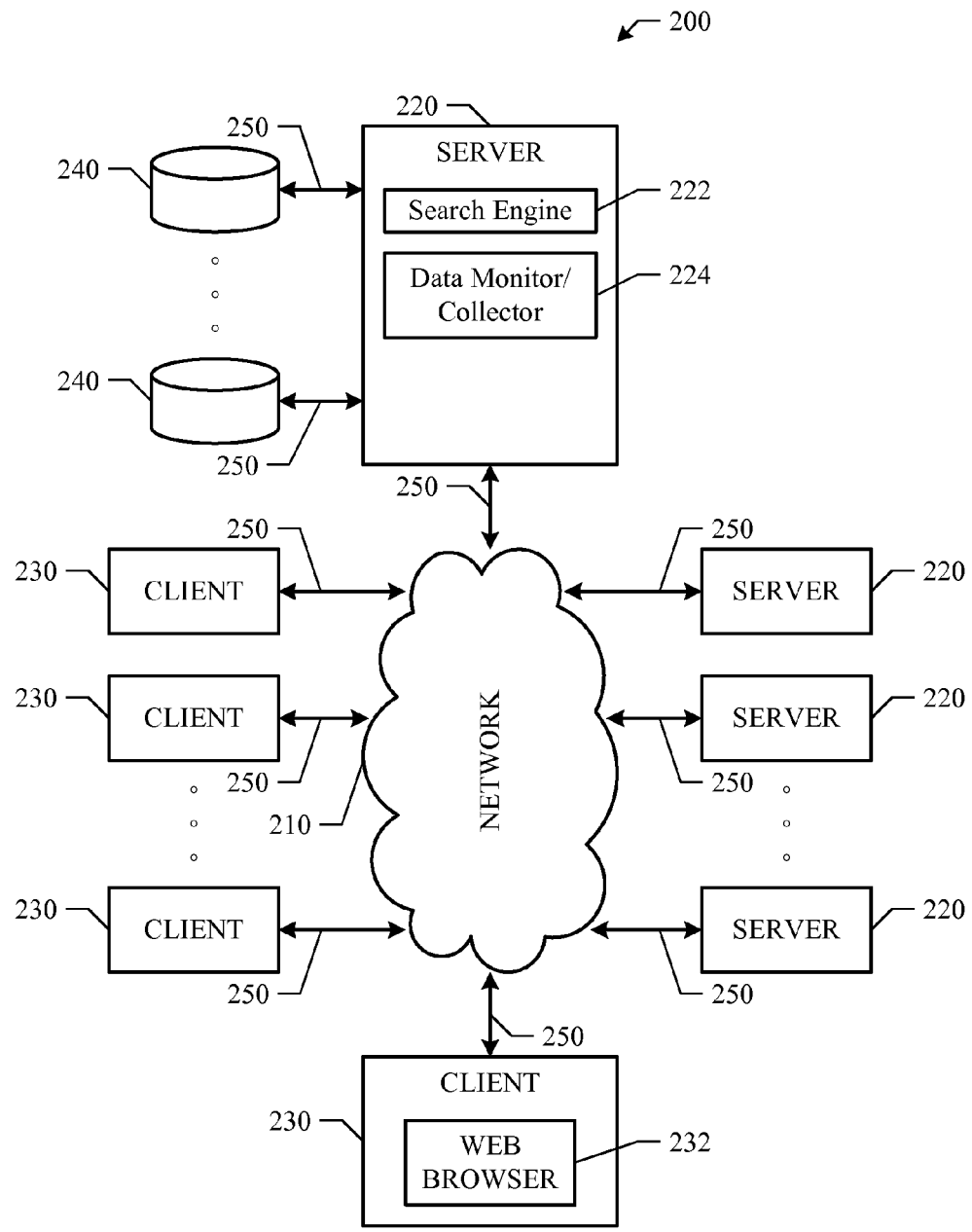
FIG. 2 illustrates an example network environment.

Particular embodiments may be implemented in a network environment. FIG. 2 illustrates an example network environment 200 suitable for providing software validation as a service. Network environment 200 includes a network 210 coupling one or more servers 220 and one or more clients 230 to each other. In particular embodiments, network 210 is an intranet, an extranet, a virtual private network (VPN), a local area network (LAN), a wireless LAN (WLAN), a wide area network (WAN), a metropolitan area network (MAN), a portion of the Internet, or another network 210 or a combination of two or more such networks 210. The present disclosure contemplates any suitable network 210.

One or more links 250 couple a server 220 or a client 230 to network 210. In particular embodiments, one or more links 250 each includes one or more wireline, wireless, or optical links 250. In particular embodiments, one or more links 250 each includes an intranet, an extranet, a VPN, a LAN, a WLAN, a WAN, a MAN, a portion of the Internet, or another link 250 or a combination of two or more such links 250. The present disclosure contemplates any suitable links 250 coupling servers 220 and clients 230 to network 210.

In particular embodiments, each server 220 may be a unitary server or may be a distributed server spanning multiple computers or multiple datacenters. Servers 220 may be of various types, such as, for example and without limitation, web server, news server, mail server, message server, advertising server, file server, application server, exchange server, database server, or proxy server. In particular embodiments, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A mail server is generally capable of providing electronic mail services to various clients 230. A database server is generally capable of providing an interface for managing data stored in one or more data stores.

In particular embodiments, a server 220 may include a search engine 222. Search engine 222 may include hardware, software, or embedded logic components or a combination of two or more such components for carrying out the appropriate functionalities implemented or supported by search engine 222. For example and without limitation, search engine 222 may implement one or more search algorithms that may be used to identify network resources in response to the search queries received at search engine 222, one or more ranking algorithms that may be used to rank the identified network resources, one or more summarization algorithms that may be used to summarize the identified network resources, and so on. The ranking algorithms implemented by search engine 222 may be trained using the set of the training data constructed from pairs of search query and clicked URL. Search engine 222 may provide suggestions to each search query received based on the suggestions, if any, determined for the search query using the method illustrated in FIG. 1.

In particular embodiments, a server 220 may also include a data monitor/collector 224. Data monitor/collection 224 may include hardware, software, or embedded logic components or a combination of two or more such components for carrying out the appropriate functionalities implemented or supported by data collector/collector 224. For example and without limitation, data monitor/collector 224 may monitor and collect network traffic data at server 220 and store the collected network traffic data in one or more log files. In particular embodiments, the log files may be stored in one or more data storages 240. Particular embodiments may parse the log files to extract queries and clicks to construct a set of query-suggestion pairs.

In particular embodiments, one or more data storages 240 may be communicatively linked to one or more severs 220 via one or more links 250. In particular embodiments, data storages 240 may be used to store various types of information. In particular embodiments, the information stored in data storages 240 may be organized according to specific data structures. In particular embodiment, each data storage 240 may be a relational database. Particular embodiments may provide interfaces that enable servers 220 or clients 230 to manage, e.g., retrieve, modify, add, or delete, the information stored in data storage 240.

In particular embodiments, each client 230 may be an electronic device including hardware, software, or embedded logic components or a combination of two or more such components and capable of carrying out the appropriate functionalities implemented or supported by client 230. For example and without limitation, a client 230 may be a desktop computer system, a notebook computer system, a netbook computer system, a handheld electronic device, or a mobile telephone. The present disclosure contemplates any suitable clients 230. A client 230 may enable a network user at client 230 to access network 230. A client 230 may enable its user to communicate with other users at other clients 230.

A client 230 may have a web browser 232, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 230 may enter a Uniform Resource Locator (URL) or other address directing the web browser 232 to a server 220, and the web browser 232 may generate a Hyper Text Transfer Protocol (HTTP) request and communicate the HTTP request to server 220. Server 220 may accept the HTTP request and communicate to client 230 one or more Hyper Text Markup Language (HTML) files responsive to the HTTP request. Client 230 may render a web page based on the HTML files from server 220 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 3:
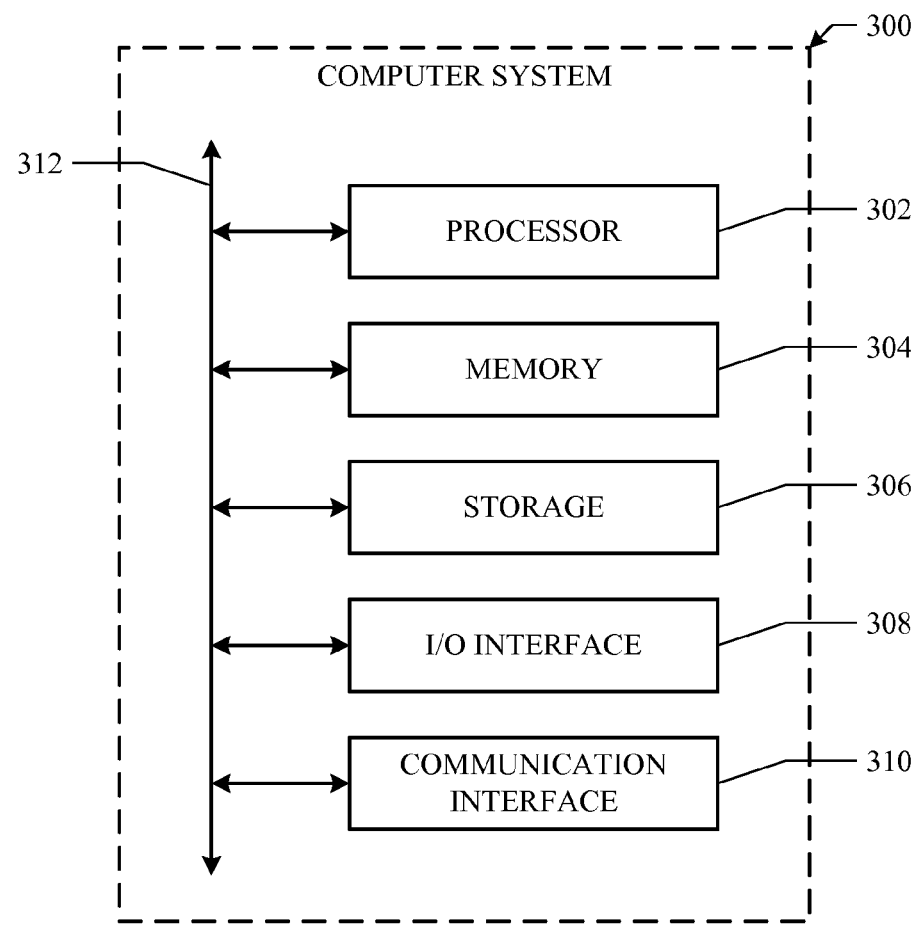
FIG. 3 illustrates an example computer system.

Particular embodiments may be implemented on one or more computer systems. FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. The present disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. The present disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: by one or more computing devices,
   selecting from a set of query-suggestion pairs a first query, wherein:
      each query-suggestion pair from the set of query-suggestion pairs comprises a query and a suggestion; and
      the first query is the query of at least one query-suggestion pair from the set of query-suggestion pairs;
   selecting from the set of query-suggestion pairs a subset of query-suggestion pairs, wherein:
      the subset of query-suggestion pairs comprises one or more distinct query-suggestion pairs from the set of query-suggestion pairs; and
      the first query is the query of each query-suggestion pair from the subset of query-suggestion pairs;
   computing a Log Likelihood Ratio (LLR) value for each query-suggestion pair from the subset of query-suggestion pairs;
   ranking the subset of query-suggestion pairs according to their respective LLR values;
   removing from the subset of query-suggestion pairs all query-suggestion pairs whose LLR values are below a predetermined LLR threshold;
   computing a Pointwise Mutual Information (PMI) value for each remaining query suggestion pair from the subset of query-suggestion pairs;
   removing from the subset of query-suggestion pairs all query-suggestion pairs whose PMI values are below a predetermine PMI threshold; and
   constructing a ranked set of suggestions for the first query, wherein the ranked set of suggestions comprises one or more suggestions of the remaining query-suggestion pairs from the subset of query-suggestion pairs.

2. The method recited in claim 1, further comprising:
   extracting from one or more logs one or more query sequences, wherein each query sequence comprises one or more queries received at a search engine ordered according to when the one or more queries are received at the search engine;
   constructing one or more query-suggestion pairs to be included in the set of query-suggestion pairs from each query sequence, wherein constructing one query-suggestion pair from one query sequence comprises:
      selecting from the one query sequence two queries; and
      constructing the one query-suggestion pair with a preceding one of the two queries as the query and a succeeding one of the two queries as the suggestion.

3. The method recited in claim 2, wherein:
   the one or more queries of each query sequence are from a same user session; and
   each query of each query sequence is followed by at least one click indicated in the logs.

4. The method recited in claim 2, wherein, when constructing the one query-suggestion pair from the one query sequence, the two queries selected from the on query sequence are received at the search engine within a predetermined time period.

5. The method recited in claim 2, further comprising:
if an entity issues a same query multiple times to the search engine during a same day, then discarding duplicate instances of the same query of the same day when extracting the one or more query sequences; and
if the entity issues a number of queries to the search engine during the same day that is greater than a predetermined query threshold, then discarding all search queries issued by the entity of the same day when extracting the one or more query sequences.

6. The method recited in claim 1, further comprising:
computing a co-occurrence value for each query-suggestion pair from the subset of query-suggestion pairs;
removing from the subset of query-suggestion pairs all query-suggestion pairs whose co-occurrence values are below a predetermined co-occurrence threshold.

7. The method recited in claim 1, further comprising:
determining one or more statistical features for each query-suggestion pair from the subset of query-suggestion pairs;
wherein the LLR value and the PMI value of each query-suggestion pair from the subset of query-suggestion pairs are computed using the one or more statistical features determined for the query-suggestion pair.

8. The method recited in claim 1, further comprising:
receiving at a search engine the first query;
selecting from the ranked set of suggestions one or more suggestions for the first query; and
presenting the one or more suggestions to a network user issuing the first query.

9. A system, comprising:
a memory comprising instructions executable by one or more processors; and
the one or more processors coupled to the memory and operable to execute the instructions, the one or more processors being operable when executing the instructions to:
select from a set of query-suggestion pairs a first query, wherein:
each query-suggestion pair from the set of query-suggestion pairs comprises a query and a suggestion; and
the first query is the query of at least one query-suggestion pair from the set of query-suggestion pairs;
select from the set of query-suggestion pairs a subset of query-suggestion pairs, wherein:
the subset of query-suggestion pairs comprises one or more distinct query-suggestion pairs from the set of query-suggestion pairs; and
the first query is the query of each query-suggestion pair from the subset of query-suggestion pairs;
compute a Log Likelihood Ratio (LLR) value for each query-suggestion pair from the subset of query-suggestion pairs;
rank the subset of query-suggestion pairs according to their respective LLR values;
remove from the subset of query-suggestion pairs all query-suggestion pairs whose LLR values are below a predetermined LLR threshold;
compute a Pointwise Mutual Information (PMI) value for each remaining query suggestion pair from the subset of query-suggestion pairs;
remove from the subset of query-suggestion pairs all query-suggestion pairs whose PMI values are below a predetermine PMI threshold; and
construct a ranked set of suggestions for the first query, wherein the ranked set of suggestions comprises one or more suggestions of the remaining query-suggestion pairs from the subset of query-suggestion pairs.

10. The system recited in claim 9, wherein the one or more processors are further operable when executing the instructions to:
extract from one or more logs one or more query sequences, wherein each query sequence comprises one or more queries received at a search engine ordered according to when the one or more queries are received at the search engine;
construct one or more query-suggestion pairs to be included in the set of query-suggestion pairs from each query sequence, wherein constructing one query-suggestion pair from one query sequence comprises:
select from the one query sequence two queries; and
construct the one query-suggestion pair with a preceding one of the two queries as the query and a succeeding one of the two queries as the suggestion.

11. The system recited in claim 10, wherein:
the one or more queries of each query sequence are from a same user session; and
each query of each query sequence is followed by at least one click indicated in the logs.

12. The system recited in claim 10, wherein, when constructing the one query-suggestion pair from the one query sequence, the two queries selected from the on query sequence are received at the search engine within a predetermined time period.

13. The system recited in claim 10, wherein the one or more processors are further operable when executing the instructions to:
if an entity issues a same query multiple times to the search engine during a same day, then discard duplicate instances of the same query of the same day when extracting the one or more query sequences; and
if the entity issues a number of queries to the search engine during the same day that is greater than a predetermined query threshold, then discard all search queries issued by the entity of the same day when extracting the one or more query sequences.

14. The system recited in claim 9, wherein the one or more processors are further operable when executing the instructions to:
compute a co-occurrence value for each query-suggestion pair from the subset of query-suggestion pairs;
remove from the subset of query-suggestion pairs all query-suggestion pairs whose co-occurrence values are below a predetermined co-occurrence threshold.

15. The system recited in claim 9, wherein the one or more processors are further operable when executing the instructions to:
determine one or more statistical features for each query-suggestion pair from the subset of query-suggestion pairs;
wherein the LLR value and the PMI value of each query-suggestion pair from the subset of query-suggestion pairs are computed using the one or more statistical features determined for the query-suggestion pair.

16. The system recited in claim 9, wherein the one or more processors are further operable when executing the instructions to:
receive at a search engine the first query;
select from the ranked set of suggestions one or more suggestions for the first query; and present the one or more suggestions to a network user issuing the first query.

17. One or more computer-readable non-transitory storage media embodying software operable when executed by one or more computer systems to:
select from a set of query-suggestion pairs a first query, wherein:
each query-suggestion pair from the set of query-suggestion pairs comprises a query and a suggestion; and
the first query is the query of at least one query-suggestion pair from the set of query-suggestion pairs;
select from the set of query-suggestion pairs a subset of query-suggestion pairs, wherein:
the subset of query-suggestion pairs comprises one or more distinct query-suggestion pairs from the set of query-suggestion pairs; and
the first query is the query of each query-suggestion pair from the subset of query-suggestion pairs;
compute a Log Likelihood Ratio (LLR) value for each query-suggestion pair from the subset of query-suggestion pairs;
rank the subset of query-suggestion pairs according to their respective LLR values;
remove from the subset of query-suggestion pairs all query-suggestion pairs whose LLR values are below a predetermined LLR threshold;
compute a Pointwise Mutual Information (PMI) value for each remaining query suggestion pair from the subset of query-suggestion pairs;
remove from the subset of query-suggestion pairs all query-suggestion pairs whose PMI values are below a predetermine PMI threshold; and
construct a ranked set of suggestions for the first query, wherein the ranked set of suggestions comprises one or more suggestions of the remaining query-suggestion pairs from the subset of query-suggestion pairs.

18. The media recited in claim 17, wherein the software is further operable when executed by one or more computer systems to:
extract from one or more logs one or more query sequences, wherein each query sequence comprises one or more queries received at a search engine ordered according to when the one or more queries are received at the search engine;
construct one or more query-suggestion pairs to be included in the set of query-suggestion pairs from each query sequence, wherein constructing one query-suggestion pair from one query sequence comprises:
select from the one query sequence two queries; and
construct the one query-suggestion pair with a preceding one of the two queries as the query and a succeeding one of the two queries as the suggestion.

19. The media recited in claim 18, wherein:
the one or more queries of each query sequence are from a same user session; and
each query of each query sequence is followed by at least one click indicated in the logs.

20. The media recited in claim 18, wherein, when constructing the one query-suggestion pair from the one query sequence, the two queries selected from the on query sequence are received at the search engine within a predetermined time period.

21. The media recited in claim 18, wherein the software is further operable when executed by one or more computer systems to:
if an entity issues a same query multiple times to the search engine during a same day, then discard duplicate instances of the same query of the same day when extracting the one or more query sequences; and
if the entity issues a number of queries to the search engine during the same day that is greater than a predetermined query threshold, then discard all search queries issued by the entity of the same day when extracting the one or more query sequences.

22. The media recited in claim 17, wherein the software is further operable when executed by one or more computer systems to:
compute a co-occurrence value for each query-suggestion pair from the subset of query-suggestion pairs;
remove from the subset of query-suggestion pairs all query-suggestion pairs whose co-occurrence values are below a predetermined co-occurrence threshold.

23. The media recited in claim 17, wherein the one software is further operable when executed by one or more computer systems to:
determine one or more statistical features for each query-suggestion pair from the subset of query-suggestion pairs;
wherein the LLR value and the PMI value of each query-suggestion pair from the subset of query-suggestion pairs are computed using the one or more statistical features determined for the query-suggestion pair.

24. The media recited in claim 17, wherein the one software is further operable when executed by one or more computer systems to:
receive at a search engine the first query;
select from the ranked set of suggestions one or more suggestions for the first query; and
present the one or more suggestions to a network user issuing the first query.

* * * * *